METHOD OF FORMING SUPERCONDUCTING METALLIC FILMS

Filed Sept. 23, 1963 2 Sheets-Sheet 1

Inventor:
Constantine A. Neugebauer,
by Paul R. Webb, II
His Attorney.

June 27, 1967 C. A. NEUGEBAUER 3,328,200

METHOD OF FORMING SUPERCONDUCTING METALLIC FILMS

Filed Sept. 23, 1963 2 Sheets-Sheet 2

Inventor:
Constantine A. Neugebauer,
by Paul R. Webb, II
His Attorney.

United States Patent Office 3,328,200

Patented June 27, 1967

3,328,200

METHOD OF FORMING SUPERCONDUCTING METALLIC FILMS

Constantine A. Neugebauer, Schenectady, N.Y., assignor to General Electric Company, a corporation of New York Filed Sept. 23, 1963, Ser. No. 311,935
18 Claims. (Cl. 117—213)

ABSTRACT OF THE DISCLOSURE

An 0.30 micron thick superconductive niobium film is formed by the evaporation of a portion of a niobium rod within a vacuum chamber having a pressure of $1\times10^{-5}$ mm. of mercury. The lower portio nof the niobium rod is heated to its melting point to provide a high rate of evaporation and oxygen within the chamber is gettered by an initial evaporation of the niobium to enhance the purity of the deposited film. The niobium is deposited upon a glass substrate heated to 600° C. to form a film which exhibits superconductivity at 4.2° K. using a current density of 20,000 amperes per square centimeter. Superconducting alloys of $Nb_3Sn$ are formed by sequentially depositing niobium and tin upon a quartz substrate and subsequently raising the substrate temperature to 950° C. for three minutes to alloy the metals.

This application is a continuation-in-part of my copending application filed Aug. 2, 1962, as Ser. No. 214,291, now abandoned, and a continuation-in-part of my copending application filed Feb. 12, 1963, as Ser. No. 258,955, and now abandoned and both assigned to the same assignee as the present application.

This invention relates to methods of forming metallic films on substrates and more particularly to methods of evaporating high melting point superconductive metals and forming metallic films on substrates which films exhibit superconductivity when cooled below their critical temperatures.

As is well known, superconduction is a term describing the type of electrical current conduction existing in certain materials cooled below its critical temperature, $T_c$, where resistance to the flow of current is essentially nonexistent. While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in computers, generators, direct current motors and low frequency transformers, and to advances in cryogenics which removed many of the economic and scientific problems involved in extremely low temperature operations.

Metallic films have been evaporated prviously on substrates from high melting point superconductive materials. In this type of process, an electric current is passed through a wire formed of the metal to be evaporated. The substrate on which the metal will be deposited and the wire are positioned within a chamber evacuated to a pressure range of $1\times10^{-9}$ to $5\times10^{-5}$ millimeters of mercury, which is the pressure range generally attainable in industrial vacuum equipment. Films produced in this manner are not superconductive.

A superconductive tantalum film has been evaporated from tantalum metal by employing a heated tantalum wire in an evacuated chamber maintained at an exceptionally low pressure range of $10^{-10}$ to $10^{-11}$ millimeters of mercury. This work is described in a "Note on Superconducting Tantalum Films" in volume 14, pages 427–429 of the Philips Research Reports, October 1959. It is set forth on page 427 of this note that so far as the authors are aware, films prepared in standard evaporation equipment at a pressure of the order of $10^{-5}$ torr never show the correct transition properties. Reference is also made to the above tantalum evaporation on pages 1898–1899 of volume 33 of the "Journal of Applied Physics," 1962, in a letter to the editor entitled "Superconductive Films Made by Protected Sputtering of Tantalum or Niobium." This letter describes also the different process of sputtering tantalum or niobium in argon onto a glass substrate.

Electron beam heating has been employed to evaporate a high melting point metal, such as nickel onto a substrate in a conventionally evacuated chamber. Nickel, which is not a superconductive metal, does not exhibit superconductivity as a metallic film. The properties of metallic films will not necessarily follow the properties of the metal in bulk form. Zirconium and tantalum have been evaporated on substrates employing electron bombardment. Such work is described in an article entitled "Electron Bombardment Apparatus for Vacuum Evaporation" in volume 36, pages 89–90 of the "Journal of Scientific Instruments," 1959. Focused electron beam heating using an electron gun has also been used to evaporate niobium or tantalum metal onto a substrate. While the bulk metal was superconducting, the resulting metallic film was not superconductive.

When high melting point superconductive metals are evaporated in the above pressure range of $1\times10^{-9}$ to $5\times10^{-5}$ millimeters of mercury, these metals pick up gaseous impurities, especially oxygen, very rapidly. These impurities, if above a certain concentration, make the resulting film non-superconductive. Thus, it would be desirable to provide methods of evaporating such metals and forming metallic films on substrates which films exhibit superconductivity when cooled below their critical temperatures.

It is an object of my invention to provide a method of forming a metallic superconductive film on a substrate.

It is another object of my invention to provide a method of forming a metallic superconductive film on a substrate by evaporating a high melting point superconductive metal characterized by a vapor pressure of at least $10^{-4}$ millimeters of merucry at its melting point onto the substrate.

It is a further object of my invention to provide a method of forming a superconductive alloy film on a substrate.

In carrying out my invention in one form, a method of forming a superconductive film on a substrate comprises positioning at least one substrate within a chamber, evacuating said chamber to a pressure in the range of $1\times10^{-9}$ to $5\times10^{-5}$ millimeters of mercury, positioning a metallic member containing a superconductive metal characterized by a vapor pressure of at least $10^{-4}$ millimeters of mercury at its melting point within the chamber, heating the substrate to a temperature in excess of 25° C., heating at least a part of said superconductive metal to at least its melting point, evaporating an initial portion of the resulting molten metal within the chamber thereby gettering oxygen and oxygen compounds therein, and subsequently evaporating an additional portion of said molten metal and condensing on the substrate a superconductive film.

These and various other objects, features and advantages of the invention will be better understood from the following description taken in connection with the accompanying drawings in which.

Figure 1:
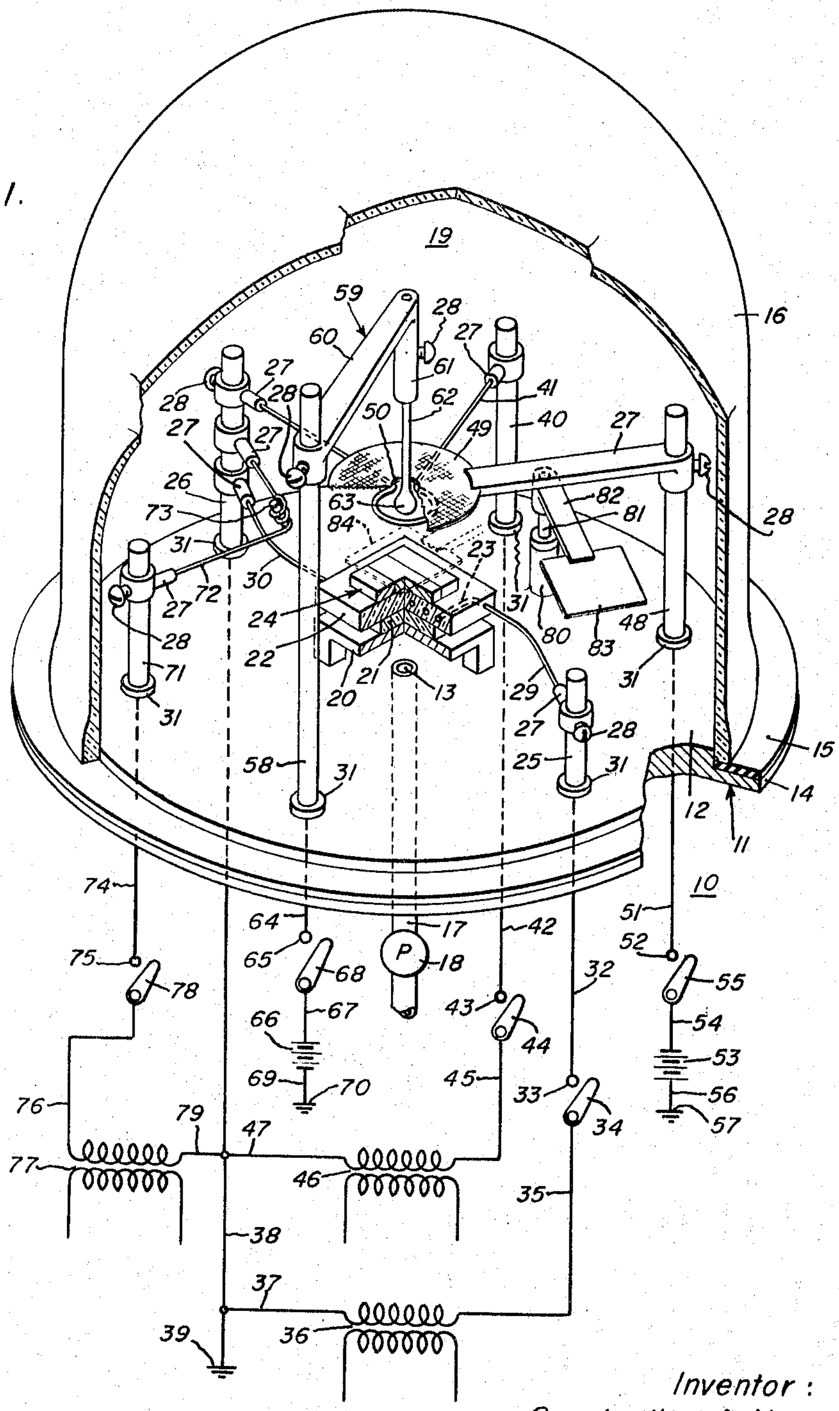
FIGURE 1 is a sectional view of apparatus for forming superconductive films on substrates in accordance with my invention.

In FIGURE 1 of the drawing, apparatus is shown generally at 10 for forming superconductive films on substrates. A metal base 11 has a raised center portion 12 with a central aperture 13 therein and an outer rim 14 on which is positioned a rubber gasket 15. A glass bell jar 16 is positioned on gasket 15 adjacent the edge of center portion 12 of base 11. An evacuation line 17 is connected to aperture 13 and to a pump 18 to evacuate a chamber 19 defined by jar 16 and center portion 12 of base 11.

A metal member 20 including support legs is positioned over aperture 13. A block 21, such as, of quartz, mica or Vycor, a refractory material manufactured by Corning Glass Works, Corning, New York, is located on the top surface of member 20 to provide electrical insulation. A member 22 of quartz, mica or Vycor, which has a plurality of heating wires 23 embedded therein, is positioned on the upper surface of block 21 and extends beyond the edges of member 20 to prevent shorting during operation of the apparatus. A plurality of metal substrates 24 are arranged on the upper surface of member 22. Such substrates can be of any high temperature melting point metal, or alloy, or of a non-metallic, refractory material. For example, copper, aluminum, quartz, mica or Vycor, is employed.

A pair of rods 25 and 26 each have an adjustable arm 27 with a set screw 28 to support leads 29 and 30 connected to heating wires 23. Each rod is supported in an electrically insulating sleeve 31 positioned in an aperture in portion 12 of base 11. A lead 32 from rod 25 has a terminal 33 which is contacted by a switch 34. A lead 35 is connected from a variable transformer 36 to switch 34. A second lead 37 is connected to a lead 38 grounded at 39. Lead 38 is connected to rod 26. Transformer 36, which is connected to a 115 volt A.C. current source, provides a 0–40 volt, 0–5 ampere range power source to heat wires 23 in member 22. The temperature of substrates 24 can be heated in this manner to values in excess of 1000° C.

A rod 40 supported in an electrically insulating sleeve 31 is also provided with an adjustable arm 27. A second arm 27 of rod 36 and arm 27 of rod 40 support a wire 41, for example of tungsten therebetween. Wire 41 is shown in V-shape with a loop at the base of the V. A lead from rod 40 has a terminal 43 which is contacted by a switch 44. A lead 45 is connected from a transformer 46 to switch 44. Another lead 47 connects transformer 46 to lead 38 which is grounded at 39. Lead 38 is connected to rod 26. Transformer 46, which is connected to a 115 volt A.C. current source, provides a 16 volt, 18 ampere power source for wire 41.

A rod 48 supported in an insulating sleeve 31 carries an adjustable arm 27 which positions a molybdenum wire mesh screen 49 above the loop of wire 41. An aperture 50 is located in the center of screen 49 which aperture is in axial alignment with the opening in the loop of wire 41. A lead 51 connects rod 48 to a terminal 52. The negative terminal of a D.C. power supply 53 for example, a 500 volt D.C. supply, is connected by a lead 54 to a switch 55 which contacts terminal 52. A lead 56 connects the positive terminal of power supply 53 to a ground 57. In this manner, screen 49 carries a potential of minus 500 volts.

A rod 58 supported in a sleeve 31 carries an L-shaped member 59 which has a portion 60 mounted adjustably on rod 58 by means of a set screw 28. A portion 61 of member 59 holds a rod 62 of a high melting point superconducting metal, such as niobium by means of a set screw 28. Rod 62 is a metallic member containing a high melting point superconductive metal or a high melting point superconductive metal, either metal characterized by a melting point above 1500° K. and by a vapor pressure of at least $10^{-4}$ millimeters of mercury at its melting point. At the free end of rod 62, there is shown a globule 63 of niobium which was formed during a previous melting of the tip of rod 62. Rod 62 is positioned within aperture 50 of screen 49 and the opening in the loop of wire 41 so that globule 62 is located slightly above or within the loop of wire 41. A lead 64 connects rod 58 to a terminal 65. The positive terminal of a 300 ma., 3000 v. variable D.C. power supply 66 is connected by a lead 67 to a switch 68 which contacts terminal 65. A lead 69 connects power supply 66 to a ground 70.

A rod 71 supported in a sleeve 31 has an arm 27 adjusted by a set screw 28. Arm 27 supports a molybdenum wire 72 with a heating coil at its midpoint. A globule 73 of a relatively low temperature melting point metal, such as tin, is contained within the coil. The other end of wire 72 is carried by a third arm 27 on rod 26. A lead 74 connects rod 71 to a terminal 75. A lead 76 connects a variable transformer 77 to a switch 78 adapted to contact terminal 75. A lead 79 connects transformer 77 to lead 38 which is grounded at 39. Lead 38 is connected to rod 26. The tin globule is employed only in the formation of superconductive alloy films of $Nb_3Sn$.

An insulating sleeve 80 positions a pivotal rod 41 with an arm 82 supported thereon. Rod 81 is moved from outside chamber 19 by any suitable means (not shown). Arm 82 secures a shield 83 in the form of a flat molybdenum sheet which is pivoted to a position shown by dotted lines 84.

Figures 2, 3, 4, 5:
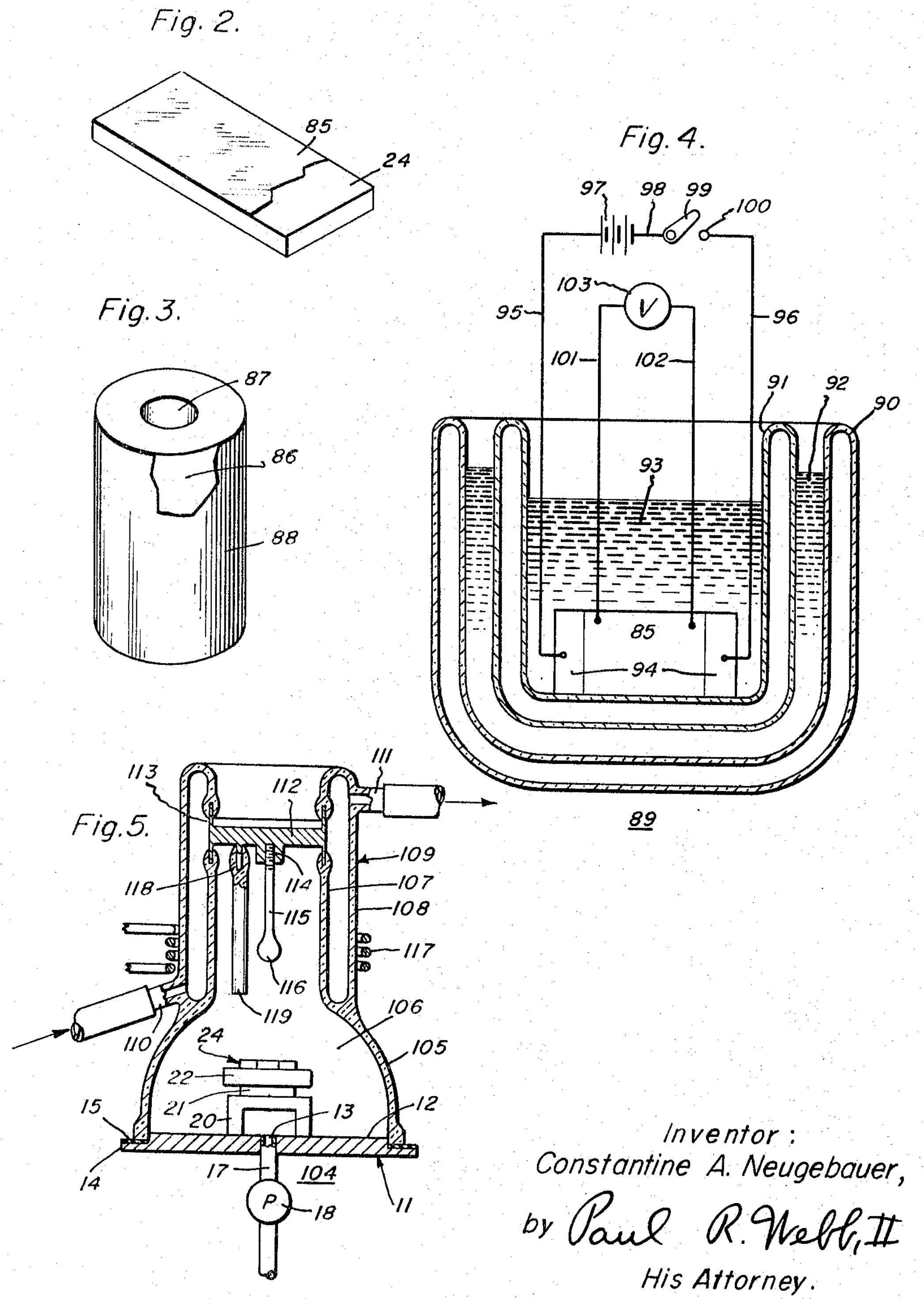
FIGURE 2 is a perspective view of a substrate with a superconducting film thereon.
FIGURE 3 is a perspective view of a modified substrate with a superconducting film thereon.
FIGURE 4 is a sectional view of apparatus to determine superconductivity of a film.
FIGURE 5 is a sectional view of modified apparatus including induction heating.

In FIGURE 2 of the drawing, there is shown a metallic substrate 24 as is disclosed in FIGURE 1 of the drawing. For example, this substrate 24 is made of copper. A superconducting film 85 of niobium is shown evaporated onto at least one surface of substrate 24.

In FIGURE 3 of the drawing, there is shown a cylinder 86 of copper with a central aperture 87 therethrough. The exterior side wall of cylinder 86 has a superconducting film 88 of niobium thereon. The rod was revolved around its axis during the evaporation of niobium thereon.

I discovered that a superconductive film could be formed on a substrate by positioning a substrate within a chamber, evacuating the chamber to a pressure in the range of $1\times10^{-9}$ to $5\times10^{-5}$ millimeters of mercury, positioning a metallic member containing a high melting point superconductive material characterized by a vapor pressure of at least $10^{-4}$ millimeters of mercury at its melting point within the chamber, heating the substrate at a temperature in excess of 25° C., heating at least a part of said superconductive metal to at least its melting point, evaporating an initial portion of the metal within the chamber thereby gettering oxygen and oxygen compounds therein, and subsequently evaporating an additional portion of the molten metal and condensing on the substrate a film exhibiting superconductivity.

I found that suitable superconductive metals for evaporation in accordance with my method include high melting point metals characterized by a vapor pressure of at least $10^{-4}$ millimeters of mercury at their melting points. For example, tantalum, niobium or vanadium provides such a suitable metal. Secondly, any of these metals can be contained in a metallic member such as a niobium-tungsten member. I found that it is necessary to heat at least a part of the superconducting metal to at least its melting point or higher. This can be done by electron bombardment or by induction heating to produce a high rate of initial and subsequent evaporation, and only in this manner is there formed a film which is superconducting when lowered below its critical temperature.

I found that both metallic and non-metallic refractory materials provided suitable substrates for evaporating such a superconducting film thereon. In view of the heat which will be generated by the molten portion of the superconductive metal, it is desirable to employ a metallic substrate such as copper or aluminum or a non-metallic refractory substrate such as quartz, mica or Vycor.

In order to produce the superconducting film on the above substrates, I found that it is necessary to heat the metallic or the non-metallic refractory substrate to a temperature in excess of 25° C. Normally, the heat generated by the molten portion of the super-conductive metal heats the substrate to a temperature in excess of 25° C. and generally to a temperature of several hundred degrees centigrade. I found further that if the substrate is not heated to a temperature in excess of 25° C., the film which is formed on the substrate will not exhibit superconductivity when lowered below its critical temperature.

In the above method of forming a superconductive film on a substrate, I found that as the rapid deposition rate is increased, a lower substrate temperature is tolerable in the process. The rate of deposition is defined as the number of metal atoms which impinge upon a square centimeter of substrate in a second. Since at least a part of the superconductive metal is heated to at least its melting point, the deposition rate can be increased by increasing the amount of molten metal. Also, this rapid reposition rate can be varied by moving the substrate closer to or farther away from the molten portion of the substrate metal. However, it is necessary to employ a substrate temperature in excess of 25° C. to produce superconductivity in the deposited film when lowered below its critical temperature. If the substrate is sufficiently far away from the molten portion of the superconductive metal, it is then necessary to employ auxiliary heating of the substrate to have the substrate temperature in excess of 25° C. Normally, such auxiliary heating is unnecessary since the heat radiated from the molten portion of the superconductive metal will maintain the substrate at a temperature in excess of 25° C. The heating of the substate to a temperature in excess of 25° C. is required for both the metallic and the non-metallic refractory substrates.

In connection with the heating of the substrate to a temperature in excess of 25° C., I found that no adhesion problem appears to exist when a material containing superconductive metal is evaporated onto a metallic substrate. However, I have found that it is desirable to improve the adhesion of a superconducting film of one micron or more in thickness on a non-metallic refractory substrate. This can be accomplished by heating the substrate to a temperature generally in the temperature range of 600° C. to 1000° C. and preferably at about 600° C. during evaporation, thereby providing better adhesion between the film and the substrate. Thus, when it is desired to evaporate a superconductive film having a thickness of one micron or more on a non-metallic refractory substrate, it is necessary to employ a substrate temperature of at least 600° C. Under these circumstances, the substrate will, of course, be at a temperature in excess of 25° C. In such an evaporation, auxiliary heating is employed in addition to the heat generated by the molten portion of the superconductive metal to raise the substrate temperature to at least 600° C.

The electron bombardment or induction heating which is employed in the process to produce a high rate of initial and subsequent evaporation allows a higher residual gas pressure to be tolerated since the deposition rate is high. I found further that when an evacuation pressure range of $1\times10^{-9}$ to $5\times10^{-5}$ millimeters of mercury is employed, it is necessary that the oxygen and oxygen containing compounds such as $H_2O$, $CO$ and $CO_2$ be gettered or removed from the chamber. The material to be evaporated is employed in a sufficiently pure form to eliminate the production of additional oxygen or oxygen containing compounds. The evacuation system is also checked to be certain that there are no large leaks into the chamber where the evaporation process is taking place.

The third and most important source of oxygen containing compounds is from the residual gas within the chamber. When the chamber is evacuated, such oxygen compounds are not completely removed. If the evaporation takes place in such a chamber without removal of the oxygen from the oxygen containing compounds, a film of superconducting material can be evaporated onto a substrate but the film will not be superconductive when lowered below its critical temperature because of its relatively high impurity content.

I have discovered that rapid evaporation of the material to be deposited and oxygen gettering by the material to be evaporated will produce a film which is superconductive when lowered below its critical temperature. This rapid evaporation and oxygen gettering are employed in the following manners to produce a superconductive film. The material to be evaporated is not confined within an enclosure within the chamber but the material is allowed to evaporate over a large area including both the substrate and the interior of the chamber. In this manner, I have found that the material which is evaporated over this large area getters the oxygen and the oxygen containing compounds in the chamber. While the initial portion of material evaporated onto the substrate and onto the interior of the chamber is contaminated, the subsequent evaporation which is continuous with or interrupted from the initial evaporation of the material will reduce rapidly the level of oxygen and oxygen containing compounds to a tolerable level and will produce a film on the substrate which is superconductive.

Such oxygen gettering can also be accomplished in at least one other manner. A shield of metal, such as molybdenum, is positioned between the substrate and the material to be evaporated within the evacuated chamber. The evaporation of the material is commenced whereupon the material will evaporate on both the shield and a substantial portion of the interior of the chamber without any deposit on the substrate. The evaporated material will getter the oxygen and the oxygen containing compounds present in the chamber. The shield is then moved away from its initial position whereupon material is evaporated on the substrate to produce a superconducting film thereon. The employment of the shield is particularly advantageous when it is desired to produce a thin film of superconducting material on the substrate. Of course, such operation may be used in the production of thicker substrate films.

Superconductive alloy films can also be produced on a substrate in accordance with my method. After a high melting point, superconductive material is evaporated on a substrate, a second superconductive metal, such as tin is heated to its evaporation temperature and evaporated on the upper surface of the first superconductive metal. The substrate with its metal films is heated to form a superconductive alloy film. For example, the films of niobium and tin are heated by the heating member to a temperature of approximately 950° C. to form an $Nb_3Sn$ film thereon.

In the operation of the apparatus shown in FIGURE 1 of the drawing, a plurality of copper substrates 24 in the form of bars 1 inch x 0.25 inch x 40 mils are positioned adjacent one another on a Vycor member 22 having a heating wire 23 embedded therein. Member 22 is positioned on an electrically insulated block 21 which is supported on a metallic member 20. A tungsten wire 41 with a V-shaped configuration having a loop at its end is attached to arms 27 of rods 26 and 40. A niobium rod 62 of ⅛ inch diameter is positioned in portion 61 of L-shaped member 59 supported on rod 58. Arm 27 of rod 48 supports a high temperature wire screen 49 of molybdenum having a central aperture 50 therein. The free end of rod 62 extends through aperture 50 and the aperture formed by wire 41 and is positioned slightly above or within the loop of wire 41. Bell jar 16 is positioned on rubber gasket 15 and its inner edge is adjacent to center portion 12 of base member 11. Pump 18 evacuates chamber 19 through exit line 17 to a pressure in the range of $1\times10^{-9}$ to $5\times10^{-5}$ millimeters of mercury. Substrates 24 are positioned approximately one inch from the end of rod 62. Rod 48 is connected to the negative terminal of power source 53 by terminal 52 and switch 55 to provide a negative potential of minus 500 volts on the wire screen 49. Rod 58 is connected to the positive terminal of a 300 ma., 3000 volt variable direct current power supply 66 which is grounded from its opposite terminal. Transformer 46 is energized to provide, for example, a 16 volt, 18 ampere source of electrons. Switch 44 is closed to contact terminal 43 whereupon the power from transformer 46 heats wire 41 to emit electrons. Switch 68 is closed providing a potential of the order of 150 volts on rod 62. Switch 55 is closed providing a negative potential of minus 500 volts on screen 49. The electrons from heated wire 41 are accelerated to the tip of rod 62 by the high voltage between rod 62 and wire 41. Screen 49 causes the electrons to focus on the tip portion of rod 62 which is heated to its melting point whereupon globule 63 forms at the tip of rod 62. Maximum rate of evaporation is obtained by maintaining globule 63 at its melting point. A portion of niobium metal from globule 63 of rod 62 is evaporated rapidly on the interior surface of chamber 19 and on substrates 24. The initial evaporated metal getters oxygen and oxygen containing compounds within chamber 19. The subsequent evaporation of an additional portion of niobium metal and its condensation on the substrates forms a film exhibiting superconductivity. Substrates 24 are maintained at a temperature of approximately 300° C. by the heat from globule 63 at the tip of rod 62. These substrates must be heated to a temperature of above 25° C. to have the condensed film exhibit subsequent superconductivity below its critical temperature. For example, a micron film of superconductive niobium is produced on the upper surface of each substrate in a period of 40 minutes.

Switches 44, 55 and 68 are opened and chamber 19 is allowed to cool to room temperature. After chamber 19 is returned to atmospheric pressure, bell jar 16 is removed therefrom. The substrates 24 with superconducting films thereon are then removed from chamber 19.

The operation of apparatus 10 is also performed in the above manner with additional gettering of oxygen and oxygen containing compounds during the evaporation of the niobium onto substrates 24. This is accomplished by pivoting rod 81 supported in insulated sleeve 80 by any suitable means (not shown) to position a molybdenum shield 83 between substrates 24 and rod 62. Wire 41 is heated to melt globule 63 as described above and niobium metal from rod 62 is evaporated rapidly on the interior surfaces of chamber 19 including shield 83 thereby increasing the amount of gettering of oxygen and oxygen containing compounds therein. The shield is then removed or moved away from its initial position so that rapid evaporation of an additional portion of niobium metal forms a superconductive film of niobium on substrates 24.

If it is desired, to form a superconductive alloy film on the upper surfaces of substrates 24, the above procedure is followed with or without the use of shield 83 to form a film of niobium on the upper surfaces of members 24. Switches 44, 55 and 68 are then opened to terminate the electron bombardment heating and evaporating of a portion of metal rod 62. Switch 78 is closed by contacting terminal 75 to produce a power supply of, for example 5 volts, 15 amperes from transformer 77 to heat molybdenum wire 72 and particularly its coil containing tin globule 73 which wire 72 is supported by arms 27 on rods 26 and 71. The tin is heated to its evaporation temperature and a layer of tin is thereby evaporated on the niobium layer. Switch 78 is then opened to terminate this heating. Switch 34 is then closed to produce a power supply from variable transformer 36. Wires 23 in member 22 are heated to the desired temperature to heat the substrate with its associated evaporated metals to form a superconductive alloy film on substrates 24. For example, substrates 24 of metal or non-metallic, refractory material are heated to a temperature of approximately 950° C. to alloy tin to form a superconductive alloy film on substrates 24. Additional layers of these metals can be evaporated on substrates 24 prior to their alloying by heating.

When a non-mtallic, refractory member has a metallic film, such as niobium evaporated thereon, it is often desirable to provide better adhesion between the superconductive film and the non-metallic refractory substrate, particularly when the film is of the thickness of one micron or more. This is accomplished by closing switch 34 to provide a voltage of up to 40 volts and a current of up to 5 amperes from variable transformer 36 to heat wires 23 in member 22 during metal evaporation on substrates 24. A temperature in the range of 600° C. to 1000° C. for substrates 24 has proved effective in providing better adhesion between such substrates and the superconductive films thereon. Wires 23 are also employed as an auxiliary heat source to heat the metallic or non-metallic refractory substrates to a temperature in excess of 25° C.

As is shown in FIGURE 2 of the drawing, a copper substrate 24 has a superconductive film 85 of niobium evaporated thereon. This evaporation is accomplished in the apparatus shown in FIGURE 1 of the drawing.

In FIGURE 3 of the drawing, a cylinder 86 of copper having a central aperture 87 therethrough has a superconductive film 88 of niobium on its exterior side wall. This film is evaporated on the cylinder in the apparatus shown in FIGURE 1 of the drawing. During the process, cylinder 86 is rotated on its axis.

In FIGURE 4 of the drawing, there is shown an insulated container 89 having an exterior insulated vessel 90, an inner insulated 91 separated by liquid nitrogen 92. Within inner vessel 91, there is positioned a substrate 24 having a superconductive film 85 thereon immersed in liquid helium 93. At opposite ends of the superconductive film 85, there is provided a layer of indium solder 94. A pair of leads 95 and 96 are connected to the opposite layers of indium layers 94. Lead 95 is connecte dto a battery 97 which has a lead 98 from its opposite terminal to a switch 99. Lead 96 has a terminal 100 adapted to be contacted by switch 99. Battery 97, lead 98, switch 99, and terminal 100 are located outside of the insulated vessel 91. A second pair of leads 101 and 102 are soldered to the superconductive film 85 on substrate 24. These leads are connected to a voltmeter 103 which is positioned outside of vessel 91.

In the operation of the test apparatus shown in FIGURE 4 of the drawing, switch 99 is closed by contacting terminal 100. Voltmeter 103 provides a reading which indicates whether the film is or is not superconducting. If the voltmeter continues a zero reading, the superconductive film is then known to be superconductive at a temperature below its critical temperature.

In FIGURE 5 of the drawing, there is shown modified apparatus 104 for forming superconductive films on substrates. Metal base 11 has a center portion 12 with central aperture 13 therein and an outer rim 14 on which is positioned a gasket 15. A glass bell jar 105 is positioned on gasket 15 adjacent the edge of center portion 12 of base 11. An evacuation line 17 is connected to aperture 13 and to pump 18 to evacuate a chamber 106 defined by bell jar 105 and center portion 12 of base 11.

A metal member 20 including support legs is positioned over aperture 13. A block 21, such as a quartz, mica or Vycor is located on the top surface of member 20 to provide electrical insulation. A member 22 of quartz, mica or Vycor which has a plurality of heating wires (not shown) embedded therein is positioned on the upper surface of block 21 and extends beyond the edges of member 20 to prevent shorting during operation of the apparatus. A plurality of metal substrates 24 are arranged on the upper surface of member 22. Such substrates can be of any high temperature melting point metal or alloy, or of a nonmetallic refractory material.

The upper portion of bell jar 105 with a diameter less than its lower portion has an inner wall 107 and an outer well 108 forming a condenser 109. Water is supplied to condenser 109 through water inlets 110 and discharged from water outlet 111. A metal support bracket 112 has a rim 113 at its periphery which is bonded by any suitable means to inner wall 107 of condenser 109. Bracket 112 has a threaded portion 114 which positions the threaded end of a rod 115 of a high melting point superconductive metal, such as niobium. At the free end of rod 115 there is shown a globule 116 of niobium which is formed during a previous melting of the tip of rod 115. An induction coil 117 surrounds a portion of the exterior wall of condenser 109 adjacent the tip of rod 115. A projection 118 from bracket 112 carries a glass rod 119 which is at least the length of rod 115.

Induction coil 117 is provided to heat and melt at least a part of the superconductive metal in rod 115. For simplification, the apparatus and circuitry for heating wires 23 in member 22, and for heating a second metal to produce a superconductive alloy film, which are shown in FIGURE 1, are not repeated in FIGURE 5. Shield 83 with its associated equipment is also not shown in this figure of the drawing for the same reason. However, it is to be understood that these parts of the apparatus which are disclosed in FIGURE 1 of the drawing and described above are also applicable to the apparatus shown in FIGURE 5.

In the operation of the apparatus shown in FIGURE 5 of the drawing, a plurality of copper substrates 24 are positioned adjacent one another on a Vycor member 22. Member 22 is positioned on an electrically insulated block 21 which is supported on a metallic member 20. A niobium rod 115 is threaded in support bracket 112 and glass rod 119 is carried by this bracket. Bell jar 105 is positioned on rubber gasket 15 and its inner edge is adjacent to center portion 12 of base member 11. The tip of rod 115 is positioned within and surrounded by induction coil 117 which is located around the exterior wall of condenser 109. Water is flowed through the condenser during operation to cool bell jar 105.

Pump 18 evacuates chamber 106 through exit line 17 to a pressure in the range of $1\times10^{-9}$ to $5\times10^{-5}$ millimeters of mercury. Substrates 24 are positioned approximately one inch from the end of rod 115. Induction coil 117 is energized from a variable power source (not shown) to heat and melt at least a part of the superconducting metal in rod 115 as shown, for example, by globule 116. A portion of niobium metal from globule 116 of rod 115 is evaporated on the interior surface of chamber 106 and on substrates 24. The initial portion of the evaporated metal getters oxygen and oxygen containing compounds within chamber 106. Glass rod 119 casts a shadow on the interior of inner wall 107 of condenser 109 to prevent a continuous annular deposit of metal on wall 107. In this manner, effective heating and melting of a portion of rod 115 is accomplished. The subsequent evaporation of an additional portion of niobium metal and its condensation on the substrates forms a film exhibiting superconductivity. Substrates 24 are maintained at a temperature of approximately 300° C. by the heat from globule 116 at the tip of rod 115. These substrates must be heated to a temperature in excess of 25° C., to have the condensed film exhibit subsequent superconductivity below its critical temperature.

The induction heating is terminated and the chamber 106 is allowed to cool to room temperature. After the chamber is returned to atmospheric pressure, bell jar 105 is removed therefrom. The substrates 24 with superconducting films thereon are then removed from chamber 106. If it is desired, superconductive alloy films can be produced in apparatus 104 employing heating of the second metal as described above for the apparatus in FIGURE 1. Shield 83 which is also shown in FIGURE 1 can be employed in apparatus 104 during the formation of superconductive films or superconductive alloy films.

Copper substrate 24, which is employed in apparatus 104, is shown in FIGURE 2 of the drawing wherein a superconductive film 85 of niobium is evaporated thereon. Copper cylinder 86, which is shown in FIGURE 3 of the drawing could also be employed in apparatus 104 to evaporate, for example, a superconductive film 88 of niobium on the exterior side wall of the cylinder. The test apparatus of FIGURE 4 is also used to determine whether the evaporated film is superconductive.

The following Examples I and II disclose methods of forming films from superconducting metals. In Example I, a glass substrate was maintained at a temperature of 25° C. during the evaporation of the film thereon and resulted in a film which was not superconducting when lowered below its critical temperature. In Example II, a glass substrate was heated to a temperature of about 400° C. during evaporation and the resulting film was superconducting when lowered below its critical temperature.

*Example I*

Apparatus was set up in acordance with FIGURE 1 of the drawing. A glass substrate was positioned on the electrically insulated member supported on the base member. A niobium rod having the diameter of 1/4 inch was employed as the metallic member from which niobium was evaporated on the substrate. The bell jar was placed on the rubber gasket positioned on the rim of the base member. The chamber within the bell jar was evacuated by the pump to a pressure of $1\times10^{-5}$ millimeter of mercury. The substrate was approximately 1½ inch from the end of the niobium rod. The tungsten wire surrounding the end of the rod was heated from a 16 volt, 18 ampere power source. The 300 ma., 300 D.C. variable power source was connected to the niobium rod and the molybdenum wire screen surrounding the rod which was maintained at a negative potential of minus 500 volts to provide electrical bombardment heating of the niobium rod. The rapid deposition was continued at a rate of about 0.5 micron an hour for a period of approximately 35 minutes. The glass substrate was thermostated in a copper block at a temperature of 25° C. At the end of this time, the power sources were discontinued and the apparatus was allowed to cool to room temperature. The chamber was then returned to atmospheric pressure. The bell jar was removed from the rubber gasket to provide access to the glass substrate therein. The substrate had a film of niobium which was 0.30 micron thick. Subsequently, this coated substrate was tested at a temperature of 4.2° K. using a current density of 100 amperes per square centimeter. The film did not exhibit superconductivity.

*Example II*

The same apparatus was employed as in Example I above. The deposition conditions were identical with the important exception that the glass substrate was heated to a temperature of about 400° C. which heat was radiated by the molten end of the niobium rod and the auxiliary heater. The substrate had a film of niobium which was 0.30 micron thick. This film was tested subsequently at a temperature of 4.2° K. using a current density of 20,000 amperes per square centimeter. This film was superconductive.

*Example III*

In the following example, apparatus which was employed in Examples I and II was also used. However, two glass substrates were employed within the bell jar upon which substrates niobium film were deposited simultaneously. One of the glass substrates was thermostated at 77°

K. while the other glass substrate was heated to about 600° C. which heat was radiated from the molten end of the niobium rod and the substrate heater. Each niobium film was 0.30 micron thick. Upon subsequent testing, the niobium film which was deposited on the substrate maintained at a temperature of 77° K. during evaporation and deposition, was not superconducting at a temperature of 4.2° K. and 10 amperes per square centimeter. The niobium film which was deposited on the glass substrate maintained at a temperature of about 600° C., was superconducting at 4.2° K. at 20,000 amperes per square centimeter.

From the above examples, I found that the substrate must be heated to a temperature in excess of 25° C. whereby the resulting film will exhibit superconductivity when lowered below its critical temperature. The substrate temperature in excess of 25° C. which is necessary for the subsequent superconducivity of the deposited film will vary above 25° C. depending upon the vacuum employed and the rate of deposition. Since one of the variables of the rate of deposition is normally maintained constant by heating the same portion of the superconductive metal to at least its melting point, the rate can be varied by moving the substrate closer to or farther away from the molten end of the superconductive rod. When a distance of one inch between the molten end of the superconducting rod and the substrate is employed, a temperature of several hundred degrees centigrade is maintained in the substrate. Thus, the subsequent film will be superconductive when lowered below its critical temperature. While the temperature of the substrate may be varied depending upon its distance from the molten end of the superconductive rod, the temperature of the substrate must be above 25° C. The lowest possible temperature above 25° C. for the specific superconductive material to be evaporated can be easily ascertained by mere routine experimentation. Thus, it was not believed necessary to determine each of these minimum temperature requirements for each of the superconductive materials with a number of varying distances between the end of the molten rod and the substrate employed.

Additional examples of methods of forming superconducting films in accordance with the present invention were as follows:

*Example IV*

Apparatus was set up in accordance with FIGURE 1 of the drawing. A plurality of copper substrates were positioned on the electrically insulated member supported on the base member. A niobium rod containing 99.9 weight percent niobium was employed as the metallic member from which niobium was evaporated onto the substrates. The bell jar was placed on the rubber gasket positioned on the rim of the base member. The chamber within the bell jar was evacuated by the pump to the pressure in the range of $1\times10^{-9}$ to $5\times10^{-5}$ millimeters of mercury. The substrates were positioned approximately one inch from the end of the niobium rod. The tungsten wire surrounding the end of the rod was heated from a 16 volt, 18 ampere power source. A 300 ma., 3000 volt D.C. variable power supply was connected to the niobium rod and the molybdenum wire screen surrounding the rod which was maintained at a negative potential of minus 500 volts to provide electron bombardment heating of the niobium rod. The rapid evaporation was continued for a period of forty minutes. The substrates were maintained at a temperature of approximately 300° C. from heat provided by the molten end of the niobium rod. At the end of this time, the power supplies were discontinued and the apparatus was allowed to cool to room temperature. The chamber was then returned to atmospheric pressure. The bell jar was removed from the rubber gasket to provide access to the copper substrates therein. Each of these substrates had a film of niobium which was one micron in thickness. Subsequently, one of these coated substrates was tested in the apparatus shown in FIGURE 4 of the drawing. Prior to testing this substrate, a coating of indium solder was applied at opposite ends on the surface of the niobium film. A pair of leads were connected to the respective indium solder portions and to a battery and associated switch. A second pair of leads were soldered at spaced-apart points on the niobium film. These leads were connected to a voltmeter. The substrate with its coating and a portion of each of the four leads were immersed in liquid helium contained in an insulated container. The switch was closed to activate the battery to provide a flow of current through the superconducting film. The voltmeter continued to register zero volts disclosing that the film was superconductive when lowered below its critical temperature.

*Example V*

Apparatus was set up in accordance with FIGURE 1 of the drawing. A plurality of glass substrates were positioned on the electrically insulated member supported on the base member. A niobium rod having a diameter of ⅛ inch was employed as the metallic member from which niobium was evaporated on the substrates. The bell jar was placed on the rubber gasket positioned on the rim of the base member. The chamber within the bell jar was evacuated by the pump to the pressure in the range of $1\times10^{-9}$ to $5\times10^{-5}$ millimeters of mercury. The substrates were positioned approximately one inch from the end of the niobium rod. The tungsten wire surrounding the end of the rod was heated from a 16 volt, 18 ampere power source. A 300 ma., 3000 volt D.C. variable power supply was connected to the niobium rod and the molybdenum wire screen surrounding the rod which was maintained at a negative potential of minus 500 volts to provide electron bombardment heating of the niobium rod. The rapid evaporation was continued for a period of approximately twenty minutes. The substrates were maintained at a temperature of approximately 300° C. from heat provided by the molten end of the niobium rod. At the end of this time, the power sources were discontinued and the apparatus was allowed to cool to room temperature. The chamber was then returned to atmospheric pressure. The bell jar was removed from the rubber gasket to provide access to the glass substrates therein. Each of these substrates had a film of nobium which was 5000 Angstroms in thickness. Subsequently, one of these coated substrates was tested in the apparatus shown in FIGURE 4 of the drawing. Prior to testing this substrate, a coating of indium solder was applied at opposite ends of the surface of the niobium film. A pair of leads were connected to the respective indium solder portions and to a battery and associated switch. A second pair of leads were soldered at spaced-apart points on the niobium film. These leads were connected to a voltmeter. The substrate with its coating and a portion of each of the four leads were immersed in liquid helium contained in an insulated container. The switch was closed to activate the battery to provide a flow of current through the superconducting film. The voltmeter continued to register zero volts disclosing that the film was superconductive when lowered below its critical temperature.

*Example VI*

Apparatus was set up in accordance with FIGURE 1 of the drawing. A plurality of quartz substrates were positioned on the electrically insulated heating member supported on the base member. A tantalum rod having a diameter of ⅛ inch was employed as the metallic member from which tantalum was evaporated on the substrates. The bell jar was placed on the rubber gasket positioned on the rim of the base member. The chamber within the bell jar was evacuated by the pump to the pressure in the range of $1\times10^{-9}$ to $5\times10^{-5}$ millimeters of mercury. The substrates were positioned approximately one inch from the end of the tantalum rod. The tungsten wire surrounding the end of the tantalum rod was heated from a 16 volt, 18 ampere power source. A 300 ma., 3000 volt D.C. variable power supply was connected to the tantalum rod and the molybdenum wire screen surrounding the rod which was maintained at a negative potential of minus 500 volts to provide electron bombardment heating of the niobium rod. The rapid evaporation was continued for a period of ten minutes. The substrates were maintained at a temperature of approximately 300° C. from heat provided by the molten end of the niobium rod. At the end of this time, the power supplies were discontinued and the apparatus was allowed to cool to room temperature. The chamber was then returned to atmospheric pressure. The bell jar was removed from the rubber gasket to provide access to the quartz substrates therein. Each of these substrates had a film of tantalum which was 5000 Angstroms in thickness. Subsequently, one of these coated substrates was tested in the apparatus shown in FIGURE 4 of the drawing. Prior to testing this substrate, a coating of indium solder was applied at opposite ends on the surface of the tantalum film. A pair of leads were connected to the respective indium solder portions and to a battery and associated switch. A second pair of leads were soldered at spaced-apart points on the tantalum film. These leads were connected to a voltmeter. The substrate with its coating and a portion of each of the four leads were immersed in liquid helium contained in an insulated container. The switch was closed to activate the battery to provide a flow of current through the superconducting film. The voltmeter continued to register zero volts disclosing that the film was superconductive when lowered below its critical temperature.

*Example VII*

Apparatus was set up in accordance with FIGURE 1 of the drawing. A plurality of quartz substrates were positioned on the electrically insulated heating member supported on the base member. A tantalum rod having a diameter of ⅛ inch was employed as the metallic member from which tantalum was evaporated on the substrates. The bell jar was placed on the rubber gasket positioned on the rim of the base member. The chamber within the bell jar was evacuated by the pump to the pressure in the range of $1\times10^{-9}$ to $5\times10^{-5}$ millimeters of mercury. The substrates were positioned approximately one inch from the end of the tantalum rod. The tungsten wire surrounding the end of the rod was heated from a 16 volt, 18 ampere power source. A 300 ma., 3000 volt D.C. variable power supply was connected to the tantalum rod and the molybdenum wire screen surrounding the rod which was maintained at a negative potential of minus 500 volts to provide electron bombardment heating of the niobium rod. The rapid evaporation was continued for a period of twenty minutes. The substrates were maintained at a temperature of 600° C. from heat provided by the molten end of the tantalum rod and from the heating member. At the end of this time, the power supplies were discontinued and the apparatus was allowed to cool to room temperature. The chamber was then returned to atmospheric pressure. The bell jar was removed from the rubber gasket to provide access to the quartz substrates therein. Each of these substrates had a tightly adherent film of tantalum which was one micron in thickness. Subsequently, one of these coated substrates was tested in the apparatus shown in FIGURE 4 of the drawing. Prior to testing this substrate, a coating of indium solder was applied at opposite ends on the surface of the tantalum film. A pair of leads were connected to the respective indium solder portions and to a battery and associated switch. A second pair of leads were soldered at spaced-apart points on the tantalum film. These leads were connected to a voltmeter. The substrate with its coating and a portion of each of the four leads were immersed in liquid helium contained in an insulated container. The switch was closed to activate the battery to provide a flow of current through the superconducting film. The voltmeter continued to register zero volts disclosing that the film was superconductive when lowered below its critical temperature.

*Example VIII*

Apparatus was set up in accordance with FIGURE 1 of the drawing. A plurality of aluminum substrates were positioned on the electrically insulated member supported on the base member. A niobium rod having a diameter of ⅛ inch was employed as the metallic member from which niobium evaporated on the substrates. The bell jar was placed on the rubber gasket positioned on the rim of the base member. The chamber within the bell jar was evacuated by the pump to the pressure in the range of $1\times10^{-9}$ to $5\times10^{-5}$ millimeters of mercury. The substrates were positioned approximately one inch from the end of the tantalum rod. The tungsten wire surrounding the end of the rod was heated from a 16 volt, 18 ampere power source. A 300 ma., 3000 volt D.C. variable power supply was connected to the tantalum rod and surrounding the rod which was maintained at a negative potential of minus 500 volts to provide electron bombardment heating of the niobium rod. A molybdenum shield was positioned initially between the end of the rod and the substrates. The rapid evaporation was commenced. After ten minutes, the shield was removed. The rapid evaporation was continued for a total period of forty minutes. The substrates were maintained at a temperature of approximately 300° C. from heat provided by the molten end of the tantalum rod. At the end of this time, the power supplies were discontinued and the apparatus was allowed to cool to room temperature. The chamber was then returned to atmospheric pressure. The bell jar was removed from the rubber gasket to provide access to the aluminum substrates therein. Each of these substrates had a film of niobium which was 5000 Angstroms in thickness. Subsequently, one of these coated substrates was tested in the apparatus shown in FIGURE 4 of the drawing. Prior to testing this substrate, a coating of indium solder was applied at opposite ends on the surface of the niobium film. A pair of leads were connected to the respective indium solder portions and to a battery and associated switch. A second pair of leads were soldered at spaced-apart points on the tantalum film. These leads were connected to a voltmeter. The substrate with its coating and a portion of each of the four leads were immersed in liquid helium contained in an insulated container. The switch was closed to activate the battery to provide a flow of current through the superconducting film. The voltmeter continued to register zero volts disclosing that the film was superconductive when lowered below its critical temperature.

*Example IX*

Apparatus was set up in accordance with FIGURE 1 of the drawing. A plurality of quartz substrates were positioned on the electrically insulated heating member supported on the base member. A niobium rod having a diameter of ⅛ inch was employed as the metallic member from which niobium was evaporated on the substrates. A tin globule contained within a molybdenum wire coil was employed as the second superconductive metal. The bell jar was placed on the rubber gasket positioned on the rim of the base member. The chamber within the bell jar was evacuated by the pump to the pressure in the range of $1\times10^{-9}$ to $5\times10^{-5}$ millimeters of mercury. The substrates were positioned approximately one inch from the end of the niobium rod. The tungsten wire surrounding the end of the rod was heated from a 16 volt, 18 ampere power source. A 300 ma., 3000 volt D.C. variable power supply was connected to the niobium rod and the molybdenum wire screen surrounding the rod which was maintained at a negative potential of minus 500 volts to provide electron bombardment heating of the niobium rod. The evaporation was continued for a period of twenty minutes. The substrates were maintained at a temperature of 600° C. from heat provided by the molten end of the niobium rod and from the heating member. At the end of this time, the power sources were discontinued. The tin globule was heated to its evaporation temperature and evaporated tin on the niobium film for two minutes. This heating was then discontinued. A second film of niobium was evaporated on the tin film in the same manner as the first niobium film for a period of twenty minutes. The power to the heating member was increased to raise the temperature of the substrates with associated films thereon to a temperature of 950° C. for three minutes to form an $Nb_3Sn$ alloy film on the substrates. This heating was then discontinued. The chamber was returned to atmospheric pressure. The bell jar was removed from the rubber gasket to provide access to the quartz substrates therein. Each of these subtrates had a tin alloy film of $Nb_3Sn$ which was one micron in thickness. Subsequently, one of these coated substrates was tested in the apparatus shown in FIGURE 4 of the drawing. Prior to testing this substrate, a coating of indium solder was applied at opposite ends on the surface of the alloy film. A pair of leads were connected to the respective indium solder portions and to a battery and associated switch. A second pair of leads were soldered at spaced-apart points on the alloy film. These leads were connected to a voltmeter. The substrate with its coating and a portion of each of the four leads were immersed in liquid hydrogen at 18° K. or below contained in an insulated container. The switch was closed to activate the battery to provide a flow of current through the superconducting film. The voltmeter continued to register zero volts disclosing that the film was superconductive when lowered below its critical temperature.

While other modifications of the invention and variation of method which may be employed in the scope of the invention have not been described, the invention is intended to include such that may be embraced within the following claims.

What I claim as new and desire to secure by Letters Patent of the United States is:

1. A method of forming a superconductive film on a substrate which comprises positioning at least one substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, heating at least a part of said superconductive metal to at least its melting point, heating said substrate to a temperature in excess of 25° C., evaporating an initial portion of the resulting molten metal within said chamber thereby gettering oxygen and oxygen containing compounds therein, and subsequently evaporating an additional portion of said molten metal and condensing on said substrate a film exhibiting superconductivity.

2. A method of forming a superconductive film on a substrate which comprises positioning at least one substrate within a chamber, evacuating said chamber to a pressure range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, positioning a shield between said substrate and said member, heating at least a part of said superconductive metal to at least its melting point, heating said substrate to a temperature in excess of 25° C., evaporating an initial portion of the resulting molten metal within said chamber thereby gettering oxygen and oxygen containing compounds therein, removing said shield, and subsequently evaporating an additional portion of said molten metal and condensing on said substrate a film exhibiting superconductivity.

3. A method of forming a superconductive alloy film on a substrate which comprises positioning at least one substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, positioning a second metal within said chamber, heating at least a part of said first superconductive metal to at least its melting point, heating said substrate to a temperature in excess of 25° C., evaporating an initial portion of the first resulting molten metal within said chamber thereby gettering oxygen and oxygen containing compounds therein, subsequently evaporating an additional portion of said molten metal and condensing on said substrate a first superconductive layer, heating said second metal to its evaporation temperature, evaporating at least a portion of said second metal on said first layer, and heating said substrate with its evaporated metals thereby forming on said substrate an alloy film exhibiting superconductivity.

4. A method of forming a superconductive alloy film on a substrate which comprises positioning at least one substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, positioning a second metal within said chamber, positioning a shield between said substrate and said member, heating at least a part of said first superconductive metal to at least its melting point, heating said substrate to a temperature in excess of 25° C., evaporating an initial portion of the first resulting molten metal within said chamber thereby gettering oxygen and oxygen containing compounds therein, removing said shield, subsequently evaporating an additional portion of said molten metal and condensing on said substrate a first superconductive layer, heating said second metal to its evaporation temperature, evaporating at least a portion of said second metal on said first layer, and heating said substrate with its evaporated metals thereby forming on said substrate an alloy film exhibiting superconductivity.

5. A method of forming a superconductive alloy film on a substrate which comprises positioning at least one substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, positioning a second metal within said chamber, heating at least a part of said first superconductive metal to at least its melting point, heating said substrate to a temperature in excess of 25° C., evaporating an initial portion of the first resulting molten metal within said chamber thereby gettering oxygen and oxygen containing compounds therein, subsequently evaporating an additional portion of said molten metal and condensing on said substrate a first superconductive layer, heating said second metal to its evaporation temperature, evaporating at least a portion of said second metal on said first layer, continuing heating and evaporating each of said metals alternately, and heating said substrate with its evaporated metals thereby forming on said substrate an alloy film exhibiting superconductivity.

6. A method of forming a superconductive film on a non-metallic, refractory substrate which comprises positioning at least one non-metallic, refarctory substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, heating at least a part of said superconductive metal to at least its melting point, heating said substrate to a temperature in excess of 25° C., evaporating an initial portion of the resulting molten metal within said chamber thereby gettering oxygen and oxygen containing compounds therein, and subsequently evaporating an additional portion of said molten metal and condensing on said substrate a film exhibiting superconductivity.

7. A method of forming a superconductive alloy film on a non-metallic, refractory substrate which comprises positioning at least one non-metallic, refractory substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, positioning a second superconductive metal within said chamber, heating at least a part of said first superconductive metal to at least its melting point, heating said substrate to a temperature in excess of 25° C., evaporating an initial portion of the first resulting molten metal within said chamber thereby gettering oxygen and oxygen containing compounds therein, subsequently evaporating an additional portion of said molten metal and condensing on said substrate a first superconductive layer, heating said second metal to its evaporation temperature, evaporating at least a portion of said second metal on said layer, and heating said substrate with its evaporated metals thereby forming on said substrate an alloy film exhibiting superconductivity.

8. A method of forming a superconductive film of at least one micron on a non-metallic, refractory substrate which comprises positioning at least one non-metallic, refractory substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, heating at least a part of said superconductive metal to at least its melting point, heating said substrate to a temperature of at least 600° C., evaporating an initial portion of the resulting molten metal within said chamber thereby gettering oxygen and oxygen containing compounds therein, and subsequently evaporating an additional portion of said molten metal and condensing on said substrate a film exhibiting superconductivity.

9. A method of forming a superconductive alloy film of at least one micron on a non-metallic, refractory substrate which comprises positioning at least one non-metallic, refractory substrate within a chamber, evacuating said chamber to a pressure in the range of $1\times10^{-9}$ to $5\times10^{-5}$ millimeters of mercury, positioning a metallic member containing a high melting point superconductive metal characterized by a vapor pressure of at least $10^{-4}$ millimeters of mercury at its melting point within said chamber, positioning a second superconductive metal within said chamber, heating at least a part of said first superconductive metal to at least its melting point, heating said substrate to a temperature of at least 600° C., evaporating an initial portion of the first resulting molten metal within said chamber thereby gettering oxygen and oxygen containing compounds therein, subsequently evaporating an additional portion of said molten metal and condensing on said substrate a first superconductive layer, heating said second metal to its evaporation temperature, evaporating at least a portion of said second metal on said layer, and heating said substrate with its evaporated metals thereby forming on said substrate an alloy film exhibiting superconductivity.

10. A method of forming a superconductive film on a substrate which comprises positioning at least one substrate within a chamber, evacuating said chamber to a pressure in the range of $1\times10^{-9}$ to $5\times10^{-5}$ millimeters of mercury, positioning a niobium metal member within said chamber, heating at least a part of said member to at least its melting point, heating said substrate to a temperature in excess of 25° C., evaporating an initial portion of the resulting molten member within said chamber thereby gettering oxygen and oxygen containing compounds therein, and subsequently evaporating an additional portion of said molten member and condensing on said substrate a niobium film exhibiting superconductivity.

11. A method of forming a superconductive film on a substrate which comprises positioning at least one substrate within a chamber, evacuating said chamber to a pressure in the range of $1\times10^{-9}$ to $5\times^{-5}$ millimeters of mercury, positioning a tantalum metal member within said chamber, heating at least a part of said member to at least its melting point, heating said substrate to a temperature in excess of 25° C., evaporating an initial portion of the resulting molten member within said chamber thereby gettering oxygen and oxygen containing compounds therein, and subsequently evaporating an additional portion of said molten member and condensing on said substrate a tantalum film exhibiting superconductivity.

12. A method of forming a superconductive film on a substrate which comprises positioning at least one substrate within a chamber, evacuating said chamber to a pressure in the range of $1\times10^{-9}$ to $5\times10^{-5}$ millimeters of mercury, positioning a vanadium metal member within said chamber, heating at least a part of said member to at least its melting point, heating said substrate to a temperature in excess of 25° C., evaporating an initial portion of the resulting molten member within said chamber thereby gettering oxygen and oxygen containing compounds therein, and subsequently evaporating an additional portion of said molten member and condensing on said substrate a vanadium film exhibiting superconductivity.

13. A method of forming a superconductive alloy film on a substrate which comprises positioning at least one substrate within a chamber, evacuating said chamber to a pressure in the range of $1\times10^{-9}$ to $5\times10^{-5}$ millimeters of mercury, positioning a niobium metal member within said chamber, positioning tin metal within said chamber, heating at least a part of said member to at least its melt-point, heating said substrate to a temperature in excess of 25° C., evaporating an initial portion of the resulting molten member within said chamber thereby gettering oxygen and oxygen containing compounds therein, subsequently evaporating an additional portion of said molten member and condensing on said substrate a superconductive niobium layer, heating said tin metal to its evaporation temperature, evaporating at least a portion of said tin metal on said niobium layer, and heating said substrate with its evaporated metals thereby forming on said substrate a niobium-tin alloy film exhibiting superconductivity.

14. A method of forming a superconductive film on a substrate which comprises positioning at least one copper substrate within a chamber, evacuating said chamber to a pressure in the range of $1\times10^{-9}$ to $5\times10^{-5}$ millimeters of mercury, positioning a niobium metal member within said chamber, heating at least a part of said member to at least its melting point, heating said substrate to a temperature in excess of 25° C., evaporating an initial portion of the resulting molten member within said chamber thereby gettering oxygen and oxygen containing compounds therein, and subsequently evaporating an additional portion of said molten member and condensing on said copper substrate a niobium film exhibiting superconductivity.

15. A method of forming a superconductive film on a substrate which comprises positioning at least one glass substrate within a chamber, evacuating said chamber to a pressure in the range of $1\times10^{-9}$ to $1\times10^{-5}$ millimeters of mercury, positioning a niobium metal member within said chamber, heating at least a part of said member to at least its melting point, heating said substrate to a tempertaure in excess of 25° C., evaporating an initial portion of the resulting molten member within said chamber thereby gettering oxygen and oxygen containing compounds therein, and subsequently evaporating an additional portion of said molten member and condensing on said glass substrate a niobium film exhibiting superconductivity.

16. A method of forming a superconductive film on a substrate which comprises positioning at least one quartz substrate within a chamber, evacuating said chamber to a pressure in the range of $1 \times 10^{-9}$ to $5 \times 10^{-5}$ millimeters of mercury, positioning a tanalum metal member within said chamber, heating at least a part of said member to at least its melting point, heating said substrate to a temperature in excess of 25° C., evaporating an initial portion of the resulting molten member within said chamber thereby gettering oxygen and oxygen containing compounds therein, and subsequently evaporating an additional portion of said molten member and condensing on said quartz substrate a tantalum film exhibiting superconductivity.

17. A method of forming a superconductive film on a substrate which comprises positioning at least one glass substrate within a chamber, evacuating said chamber to a pressure in the range of $1 \times 10^{-9}$ to $5 \times 10^{-5}$ millimeters of mercury, positioning a niobium metal member within said chamber, positioning a molybdenum shield between said substrate and said member, heating at least a part of said member to at least its melting point, heating said substrate to a temperature in excess of 25° C., evaporating an initial portion of the resulting molten member within said chamber thereby gettering oxygen and oxygen containing compounds therein, removing said shield, and subsequently evaporating an additional portion of said molten member and condensing on said glass substrate a niobium film exhibiting superconductivity.

18. A method of forming a superconductive alloy film on a substrate which comprises positioning at least one quartz substrate within a chamber, evacuating said chamber to a pressure in the range of $1 \times 10^{-9}$ to $5 \times 10^{-5}$ millimeters of mercury, positioning a niobium metal member within said chamber, positioning tin metal within said chamber, heating at least a part of said member to at least its melting point, heating said substrate to a temperature in excess of 25° C., evaporating an initial portion of the resulting molten member within said chamber thereby gettering oxygen and oxygen containing compounds therein, subsequently evaporating an additional portion of said molten member and condensing on said quartz substrate a superconductive niobium layer, heating said tin metal to its evaporation temperature, evaporating at least a portion of said tin metal on said niobium layer, and heating said substrate with its evaporated metals thereby forming on said substrate a niobium tin alloy film exhibiting superconductivity.

References Cited

UNITED STATES PATENTS

| | | | |
|---|---|---|---|
| 2,759,861 | 8/1956 | Collins et al. | 117—107 |
| 2,798,140 | 7/1957 | Kohring | 117—107 |
| 2,842,505 | 7/1958 | Alexander | 117—107 X |
| 3,036,933 | 5/1962 | Caswell | 117—107 |
| 3,055,775 | 9/1962 | Crittenden et al. | 117—212 |

ALFRED L. LEAVITT, *Primary Examiner.*

WILLIAM L. JARVIS, *Assistant Examiner.*